Patented Jan. 30, 1934

1,944,896

UNITED STATES PATENT OFFICE 1,944,896

MANUFACTURE OF CELLULOSE ETHERS

Alfred Stoyell Levesley, Saltcoats, and Frederick Charles Randall, Ardrossan, Scotland, assignors to Imperial Chemical Industries Limited, a corporation of Great Britain No Drawing. Application June 6, 1931, Serial No. 542,694, and in Great Britain June 11, 1930

13 Claims. (Cl. 260—152)

This invention relates to the treatment of cellulose ethers, and pertains more particularly to the preparation of low viscosity solutions of cellulose ethers.

In applications Nos. 5659/29, and 12035/30 filed in Great Britain, kiering processes are described for the production of cellulose ethers of substantially uniform low viscosity. These processes include the step of heating the cellulose ether with an acid or with alkyl- or aralkyl-halides under pressure. On account of the thermoplastic nature of the cellulose ethers at elevated temperatures the product obtained as a result of such treatment may consist, when hot, of a soft spongy mass which on cooling sets to a solid cake. This cake is in more or less tough condition according to the temperature and duration of the kiering treatment and the softening point of the cellulose ether. The grinding process, to which the product is subsequently submitted, therefore presents certain difficulties, and this is particularly the case with the product of the processes described in British application No. 5659/29, and owing to the plasticizing action of the alcohol produced by hydrolysis of the alkyl- or aralkyl-halide used in the kiering process.

We have now found that these difficulties may be avoided by performing the kiering operation in the presence of a sufficient quantity of a water-soluble salt, or of a mixture of such salts. We prefer to use for this purpose salts which have approximately the same solubility at raised as at ordinary temperatures (e. g. sodium chloride or potassium chloride) or salts which are more soluble in cold water than in hot (e. g. sodium citrate). The quantity of salt used should be sufficient to give a highly concentrated or even saturated solution at the highest temperature reached during the kiering process. The products obtained according to our invention are easily ground and are indeed in many cases in such a condition as to require no grinding.

Any excess of solid salt may be recovered after the kiering treatment, and the concentration of the kiering liquor may be adjusted for further use by the addition of fresh kiering agent.

Our invention is applicable not only to the processes of the British applications already mentioned but also to other processes in which cellulose ethers are submitted to a kiering treatment.

Our invention is illustrated but not limited by the following examples the parts and percentages of which are by weight.

Example 1

One hundred parts of benzyl cellulose which has a viscosity of approximately 100 c. g. s. units in 10% solution in toluene spirits mixtures (80:20) are kiered with 700 parts of 0.75% oxalic acid solution and 300 parts of sodium citrate for ¾ hour. The kiered mass is a discrete powder. It is washed free from acids and salts, and dried. The viscosity in 10% solution in toluene spirits (80:20) is 5 c. g. s. units.

Example 2

Fifty parts of ethyl cellulose with a viscosity of 250 c. g. s. units when measured in 10% solution in benzene, are kiered in a closed vessel with 575 parts of a solution containing approximately 0.95% of its weight of hydrochloric acid and 250 parts of commercial sodium chloride for a period of 30 mins. at a pressure of 25 lb. per sq. in. The resulting product in the kier is still in a loose non-caked condition, which can be easily ground in a mechanical mortar and washed free from impurities. The viscosity after purification measures 5 c. g. s. units in a 10% solution in benzene.

Example 3

One hundred parts of a partially purified benzyl cellulose reaction mass, which contains about 5–13% of benzyl chloride, and a portion of which when purified gives a viscosity of 25 c. g. s. units in a toluene spirit mixture (80:20) are heated with 1000 parts of water and 500 parts of commercial sodium chloride, for ¾ hour at 25 lb. per sq. in. pressure.

The kiered product is a loosely cohering friable mass, which is easily ground in a mechanical mortar. When washed free from salts and dried, the product gives clear solutions with a viscosity such that it is eminently suitable for the preparation of lacquers and enamels.

The term "kiering" as used throughout the specification and claims signifies digestion with heating. The term therefore has in general the same significance as when it is applied to the cotton bleaching art.

The above description of the invention and the specific examples embodied therein are to be taken as illustrative only and as not limiting the scope of the invention. Any variations or modifications which conform to the spirit of the invention are intended to be included within the scope of the claims.

We claim:

1. Process for the manufacture of cellulose ethers yielding low viscosity solutions which comprises digesting a cellulose ether yielding high viscosity solutions with dilute acids in the presence of a considerable quantity of a water soluble salt.

2. Process according to claim 1 in which the acid used for digesting is produced in situ by the hydrolysis of an alkyl or aralkyl halide.

3. Process according to claim 1 in which the quantity of salt used is sufficient to give a highly concentrated solution at the highest temperature reached during the digesting process.

4. Process according to claim 1 in which the salt used is so chosen that it is not greatly less soluble in cold water than in hot.

5. Process according to claim 1 in which the salt chosen is taken from the class consisting of sodium citrate, sodium chloride and potassium chloride.

6. Process for the manufacture of cellulose ethers yielding low viscosity solutions which comprises digesting a cellulose ether yielding high viscosity solutions with dilute acids in the presence of a considerable quantity of a water soluble salt, and grinding the digested product.

7. Process for the manufacture of cellulose ethers yielding low viscosity solutions which comprises digesting a cellulose ether yielding high viscosity solutions with dilute acids in the presence of a considerable quantity of a water soluble salt, grinding the digested product, and dissolving the ground product in a solvent.

8. A cellulose ether composition obtained by digesting a cellulose ether which yields high viscosity solutions, with dilute acid in the presence of a considerable quantity of water soluble salt,.

9. A cellulose ether composition obtained by digesting a cellulose ether which yields high viscosity solutions, with dilute acid in the presence of a considerable quantity of water soluble salt, and grinding the digested product.

10. A cellulose ether composition obtained by digesting a cellulose ether which yields high viscosity solutions, with dilute acid in the presence of a considerable quantity of water soluble salt, grinding the digested product, and dissolving the ground product in a solvent.

11. The process of claim 1 characterized in that the digesting is carried out under superatmospheric pressure.

12. The process of claim 1 in which the cellulose ether is benzyl cellulose.

13. The process of claim 1 in which the cellulose ether is ethyl cellulose.

ALFRED STOYELL LEVESLEY.
FREDERICK CHARLES RANDALL.